2,471,084

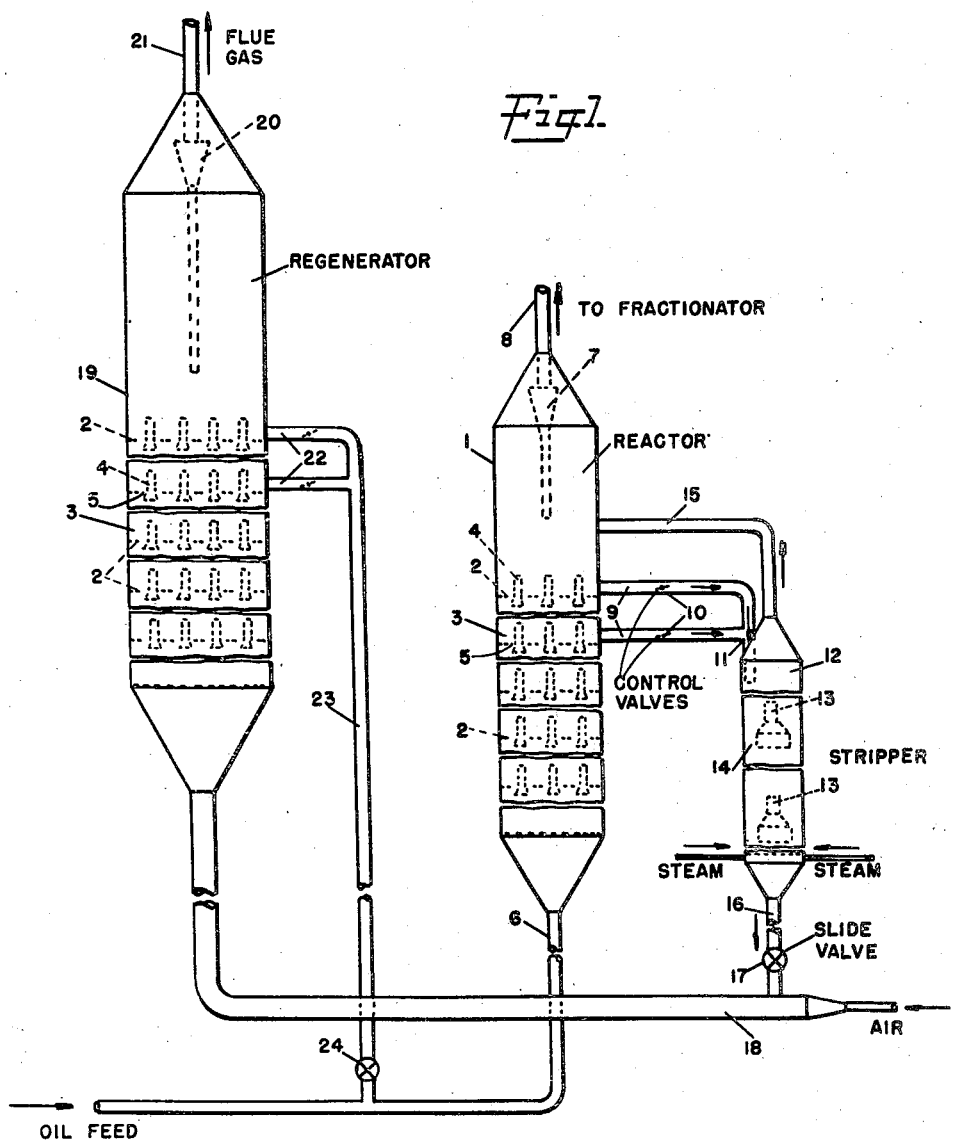

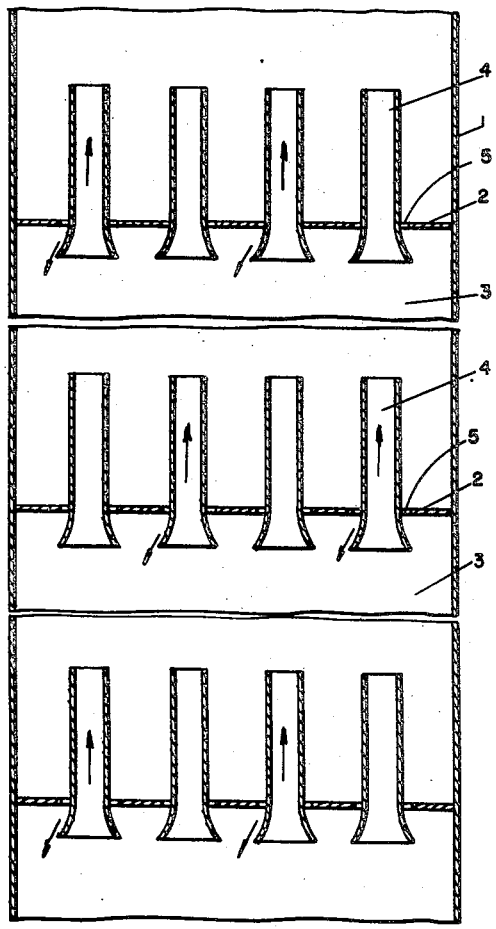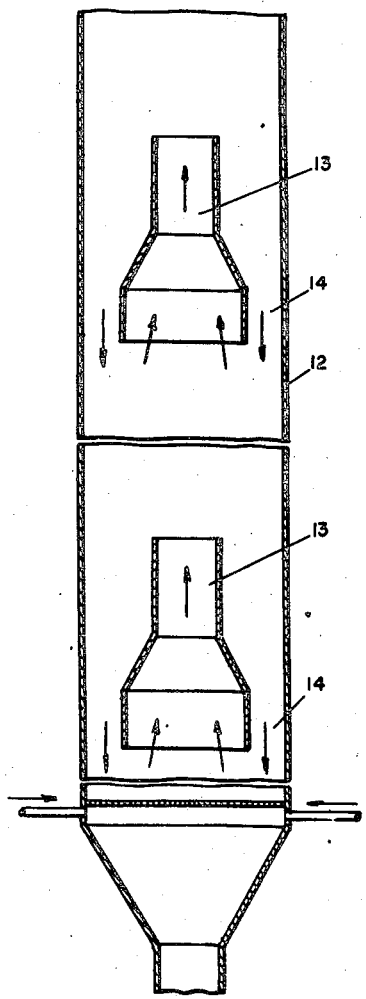
INVENTORS
RALPH ELDEN HALL AND
MARION JAMES WILCOX
BY
Pennie, Edmonds, Morton & Barrows.
ATTORNEYS Patented May 24, 1949

UNITED STATES PATENT OFFICE 2,471,084

FLUIDIZED CATALYTIC CONVERSION OF HYDROCARBONS

Marion J. Wilcox, Harvey, Ill., and Ralph E. Hall, East Chicago, Ind., assignors to Sinclair Refining Company, New York, N. Y., a corporation of Maine Application April 30, 1947, Serial No. 745,036

5 Claims. (Cl. 196—52)

This invention relates to the pyrolytic conversion of hydrocarbons and, more particularly, to pyrolytic conversion processes involving the use of a finely divided catalyst. The invention provides an improved process of increased catalytic efficiency and also a novel apparatus particularly adapted to the carrying out of the process.

The invention is especially applicable to conversion processes of the general type wherein a finely divided catalyst is brought into intimate contact with vaporized hydrocarbons to be converted in a reaction zone, spent catalyst is separated from the oil vapors, the separated catalyst stripped of oil by contact with a gaseous stripping medium in a stripping zone, regenerated by decarbonization in a regenerating zone and the regenerated catalyst returned to the reaction zone for contact with further hydrocarbon vapors to be converted.

Operations of the type described are commonly designated fluid catalyst processes. In conventional operation, spent catalyst from the reaction zone is stripped by contact with steam in a stripping zone, the carbon deposited on the catalyst particles is burned off by contact with air in a regenerating zone and the regenerated catalyst, in fluid suspension, is returned to the reaction zone.

An important consideration in operations of this type, from a practical aspect, is the efficient utilization of the catalyst. For maximum efficiency, it is necessary that all of the catalyst be utilized to an equal extent in the reaction zone and passed to the regenerator and that, in the regenerator, all of the catalyst be uniformly regenerated and returned to the reaction zone.

In operations of this type, the catalyst is usually maintained throughout the system in a fluidized condition. However, the catalyst is normally not of uniform density throughout the various stages of the operation. In both the reaction zone and the regenerating zone and also in the stripping zone, there is normally maintained a "high density," or "dense phase," body of catalyst of considerable depth, through which the gases and vapors pass and above which the catalyst, in relatively low concentration, is suspended in the ascending gases or vapors.

In conventional operation, these dense phase bodies of catalyst are in a continuously turbulent state. Because of this condition, there is a mixing of the catalyst resulting in a heterogeneous mass of catalyst in the beds. While this is beneficial from a temperature-control viewpoint, an advantage of fluidized technique in catalytic conversion, there is an inherent disadvantage in that the fresh incoming catalyst, partially spent catalyst and spent catalyst, in the case of the reactor, become intermixed in the catalyst bed. When catalyst is withdrawn from the bed for regeneration, this heterogeneous mixture is taken off and not a truly spent catalyst. Also, due to the intermixing of the fresh and spent catalyst, the average effective activity of the catalyst in the bed is less than if spent catalyst were not also present.

Similarly, in the stripper and in the regenerator a more complete stripping and burning off of the oil and carbonaceous material from the catalyst, respectively, would be possible if it were not for the mixing of the stripped and unstripped and the regenerated and partially regenerated catalyst in the respective zones.

Further, the catalyst-vapor contacts in the reactor and in the stripper, and the contact between the catalyst and regenerating gases in the regenerator are not as intimate and uniform as desirable. In the turbulent beds of catalyst, there is a tendency for large globules of the vapors, or gases, to pass upwardly through the catalyst bed without coming into intimate contact with the catalyst.

The present invention provides an improved method and means of avoiding, to a major extent at least, objectionable intermixing of the catalyst in different stages of activity and for effecting more uniform contact between the catalyst and the vapors, or gases, while maintaining the fluidized principle of operation.

In accordance with our present invention, this is accomplished by interrupting the relatively dense phase of the beds of catalyst in the stripping zone, reaction zone, and the regenerating zone, respectively, by alternate zones of less catalyst density in which the catalyst in relatively low concentration is entrained in one or more upwardly rising restricted streams of vapors, or gases, of increased velocity and permitting a portion of the catalyst to gravitate from a higher to a lower zone through annular spaces surrounding the upwardly rising gaseous streams, as herein more fully illustrated.

The invention provides an improved process adapted to continuous operation and comprising a plurality of cooperating steps so coordinated as to constitute a unitary operation in which a charge of catalyst is repeatedly used, intermittently regenerated, and returned to the reaction zone and in which increased catalytic efficiency and catalytic life is attained.

The invention will be more fully described and illustrated with reference to the accompanying drawings, Figure 1 of which represents, conventionally and diagrammatically, a flow diagram of a fluid catalyst cracking process embodying my invention; Figure 2 is an enlarged fragmentary view of the interior arrangement of both the reactor and the regenerator and Figure 3, an enlarged fragmentary view showing an advantageous arrangement of the interior of the stripper.

Referring, more particularly, to Figure 1 of the drawings, the apparatus indicated by the reference numeral 1, represents a generally cylindrical reactor provided internally with a plurality of trays 2 extending entirely across the reactor and dividing the lower and intermediate portions of the reactor into a plurality of zones 3. The trays 2 are provided with a plurality of uniformly spaced circular openings and, as more clearly appears from Figure 2 of the drawings, there is suspended in each of the openings, by suitable brackets or the like, not shown, a chimney 4 having a cylindrical body portion of somewhat smaller outer diameter than the diameter of the opening in the tray so as to provide an annular space 5, surrounding the chimney. These chimneys extend through the openings in the trays from a distance well above the tray, to somewhat below the tray, and are flared outwardly at their lower ends.

The catalyst suspended in vaporized charge oil passes into the lower end of the reactor through conduit 6 and is carried upwardly therethrough by the rising vapors. In passing upwardly through the reactor, the catalyst forms a relatively dense phase body on each of the trays, which continuously passes downwardly through the annular spaces 5, is re-entrained in the rising stream of vapors and is again carried upwardly through the chimneys.

After passing through each of the trays of the reactor and the beds of catalyst thereon, the vapors pass from the upper end of the reactor through cyclone type separator 7, for removal of suspended catalyst, the latter dropping back into the reactor and the vapors pass out through line 8 to a fractionator, not shown.

In operation, a relatively dense phase, fluidized body of catalyst, say, of a density of about 50 to 60 pounds per cubic foot, will be formed on the respective trays for a depth equal to the height of the chimneys above the tray. In the zones of the reactor between the top of a lower chimney and the lower end of the next higher chimney, there will be maintained a body of somewhat lower catalyst density, say, 25 to 35 pounds per cubic foot, due to the upward passage of the vapors therethrough. The concentration of catalyst in the streams of vapor passing upwardly through the chimneys will be still less, say, about 2 to 12 pounds per cubic foot. Thus, the catalyst will be repeatedly dispersed in the vapors in the respective zones of the reactor, affording thorough and uniform contact between the catalyst and the vapors. Though the catalyst is repeatedly circulated in the respective zones, such intermixing as occurs is primarily of catalyst of relatively similar catalytic activity, objectionable top-to-bottom mixing of the catalyst being minimized.

The summation of the depths of the bodies of catalyst between the tops of lower chimneys and the bottoms of the next higher chimneys may, with advantage, be about that of the customary depth of the catalyst bed in conventional operation. However, due to more thorough contact between the catalyst and the hydrocarbon vapors, somewhat less depth will generally be found effective to accomplish comparable results.

As previously noted, the catalyst passes downwardly through the annular spaces 5 from a higher dense phase body of catalyst to a lower zone of less density where the descending catalyst is picked up by the rising stream of vapors and carried therewith upwardly through the chimneys into the next higher zone. Accordingly, the effective path of the catalyst through the reactor in intimate contact with the vapors is increased.

Also, the vapors in passing upwardly through the reactor are periodically broken up into a plurality of relatively small streams uniformly spaced throughout the transverse area of the reactor, thus avoiding the channelling of vapors through the catalyst bed without adequate contact with the catalyst.

By so coordinating the rates of feed to the reactor, and the dimensions of the various elements of the reactor and velocities of flow, as hereinafter more fully described, the dominant flow of the catalyst through the reactor is upwardly, dense phase bodies of spent catalyst forming on the upper trays. Spent catalyst is withdrawn from one or more of the upper trays of the reactor through line or lines 9, the flow being controlled by valves 10, passes downwardly through line 11 into the upper zone of a vertically elongated, cylindrical stripper 12 and passes generally downwardly through the stripper countercurrent to steam, or other stripping medium, introduced into the lower end of the stripper. As more clearly shown in Figure 3 of the drawing, the stripper is provided internally with a plurality of chimneys 13 co-axially positioned within the stripper. These chimneys are, with advantage, somewhat larger than the chimneys of the reactor and are, likewise, flared at their lower ends and of such maximum dimension as to provide an annular space 14 between the maximum diameter of the chimney and the outer wall of the stripper.

The method and apparatus for stripping the catalyst are the subject of our copending application Serial No. 745,037 filed concurrently herewith.

Steam and stripped hydrocarbons pass from the upper portion of the stripper through line 15 into the upper portion of the reactor. In passing downwardly through the stripper, the catalyst forms a relatively dense phase bed surrounding the chimneys, of a height approximating that of the chimneys, with beds of lower density between the chimneys, and passes downwardly through annular spaces 14. The rising steam passes upwardly through the chimneys in a manner similar to that described with reference to the reactor, a portion of the downwardly flowing catalyst being caught up by the current of steam and carried upwardly through the chimney and deposited in the zone above.

Spent catalyst is withdrawn from the lower portion of the stripper through conduit 16, the flow being controlled by a slide valve 17, and passes into conduit 18 where it is caught up by a stream of air or other oxidizing gases and carried up into the generally cylindrical regenerator 19.

The regenerator 19 is provided with chimney trays, such as described with reference to the reactor, and the catalyst passes upwardly therethrough generally concurrent to the upwardly flowing stream of air, relatively dense phase beds of catalyst accumulating on the various trays, including the uppermost trays, as previously described. Operating conditions and dimensions of the various elements of the regenerator are likewise so coordinated as to effect a predominantly upward flow of catalyst through the regenerator.

In passing through the regenerator in contact with air, the carbonaceous material deposited on the catalyst is uniformly burned off. Conventional means for preventing excessive temperatures in the regenerating zone may be provided.

The flue gases pass from the upper end of the regenerator, through cyclone type separator 20, for the separation of suspended catalyst, the latter dropping back into the regenerator, and the flue gases pass off through line 21 to a precipitator or stack, not shown, in the drawing.

Regenerated catalyst is withdrawn from an upper tray or trays of the regenerator through valve-controlled lines 22, and passes downwardly through line 23 into the reactor feed line 6 and is carried therethrough in suspension in feed oil into the reactor, as previously described. Passage of the catalyst through line 23 may also be controlled by means of valve 24, advantageously of the slide valve type.

By the arrangement shown, the objectionable mixing of regenerated and spent catalyst in the regenerator and of spent, partially spent, and freshly regenerated catalyst in the reactor is minimized.

The chimney trays should be so designed and proportioned with respect to the transverse dimension of the chamber and the amount of the gaseous medium to be passed upwardly through the chamber that the gaseous medium passes upwardly at a superficial velocity within the range of 0.3 to 1.5 feet per second in the enlarged zones between the trays and at a superficial velocity through the chimneys within the range of 3.5 to 7 feet per second. By selection of the proper chimney diameters, lengths, bottom bell diameters and areas of annular openings, surrounding the chimneys, it is possible to obtain ratios of total chimney area to total tray areas of 1:3.5 to 1:15 to obtain the desired velocity range noted above.

The chimney height may vary from, say, 12 to 18 inches, the height of the chimney above the tray being from 9 to 12 inches. The selection of the sizes of the annular openings and the bell diameters, will depend upon the desired downflow rate of the catalyst from zone to zone. However, the bell diameter should be equal to, or greater than, the diameter of the annular openings in the trays. The distance between trays will depend primarily upon the number of zones desired and the total bed height of catalyst in the vessel.

Within the range of conditions noted above, the catalyst loading of the upflow vapors will vary from 2.5 to 12 pounds of catalyst per cubic foot of gaseous medium and the downflow of the catalyst through the annular opening will be within the range of 0.25 to 0.50 ton per square foot per minute. By proper proportioning of the downflow rate and the upflow rate of the catalyst through the respective trays, the direction of dominant flow of the catalyst through the contact zones will be upwardly and the rate of catalyst flow through the contact zones may be controlled.

Usually it is desirable to employ at least three trays in the reactor and in the regenerator. More than three trays is usually desirable, say 3 to 10 trays. Usually, at least 3 trays are desirable in the stripper.

The catalyst employed may be of the type conventionally used in fluid catalyst processes, for instance, a silica-alumina type catalyst in finely divided or powdered form. The reaction conditions may likewise be those conventionally used in operations of this type, and, as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied largely by the hot catalyst passing into the charge oil from the regenerator.

It will be understood that the present invention is not restricted to the particular embodiment thereof herein described but is applicable to various modifications of fluid catalyst processes.

We claim:

1. A fluid catalyst process for the conversion of hydrocarbons including the following steps: passing the catalyst in suspension in hydrocarbon vapors to be converted into the lower end of a vertically elongated reaction chamber of relatively large transverse dimension, passing the vapors upwardly through said chamber through a plurality of alternate zones of low velocity and of high velocity, the superficial velocity of the vapors in the low velocity zones being within the range of 0.3 to 1.5 feet per second, the high velocity zone being composed of a plurality of restricted streams of substantial height and the velocity of the restricted streams being within the range of 3.5 to 7 feet per second whereby catalyst will drop out of suspension in the low velocity zones, forming relatively dense fluidized bodies of catalyst therein, permitting catalyst to gravitate downwardly from the respective high density bodies to the next lower zone in annular streams surrounding the respective upwardly flowing high velocity streams of the hydrocarbon vapors and withdrawing the spent catalyst and hydrocarbon vapors from upper portions of the reaction zone.

2. A fluid catalyst process for the conversion of hydrocarbons including the following steps: passing the catalyst in suspension in hydrocarbon vapors to be converted into the lower end of a vertically elongated reaction chamber of relatively large transverse dimension, passing the vapors upwardly through said chamber through a plurality of alternate zones of low velocity and of high velocity, withdrawing spent catalyst and hydrocarbon vapors from upper portions of the reaction zone, stripping the withdrawn spent catalyst of absorbed hydrocarbons and passing the stripped catalyst in suspension in an oxidizing gaseous medium into the lower end of a vertically elongated regenerating chamber of relatively large transverse dimension, passing the vapors upwardly through said chamber, through a plurality of alternate zones of low velocity and of high velocity, the superficial velocities of the gaseous media through the low velocity zones of the reaction and regenerating zones being within the range of 0.3 to 1.5 feet per second, the high velocity zones being composed of a plurality of restricted streams of the gaseous medium of substantial height and the superficial velocities of the restricted streams being within the range of 3.5 to 7 feet per second, whereby the catalyst will drop out of suspension in the low velocity zones forming relatively dense fluidized bodies of the catalyst therein, and permitting the catalyst to gravitate downwardly from the respective high density bodies to the next lower low velocity zone in annular streams surrounding the respective upwardly flowing high velocity streams of gaseous medium, withdrawing regenerated catalyst from an upper portion of the regenerating zone and returning it in suspension in hydrocarbon vapors to the reaction zone.

3. In the fluid catalyst process for the conversion of hydrocarbons in which the hydrocarbon to be converted is passed in intimate contact with the catalyst in a reaction zone, spent catalyst is withdrawn from the reaction zone, stripped of absorbed hydrocarbons and regenerated by intimate contact with an oxidizing gaseous medium at an elevated temperature, the step of passing the catalyst in suspension in the oxidizing gaseous medium into the lower end of a vertically elongated regenerating chamber of relatively large transverse dimension, passing the suspension upwardly through said chamber through a plurality of alternate zones of low velocity and of high velocity, the superficial velocity of the gases in the low velocity zone being within the range of 0.3 to 1.5 feet per second, the high velocity zones being composed of a plurality of restricted streams of substantial height and the superficial velocities of the restricted streams being within the range of 3.5 to 7 feet per second, whereby the catalyst will drop out of suspension in low velocity zones forming relatively dense fluidized bodies of the catalyst therein, permitting the catalyst to gravitate downwardly from the respective high density bodies to the next lower low velocity zone in annular streams surrounding the respective upwardly rising high velocity gaseous streams and withdrawing regenerated catalyst and gaseous products of the regeneration from upper portions of the regenerating zone.

4. Apparatus for effecting uniform, intimate contact between a gaseous medium and a finely divided fluidized solid, comprising a vertically elongated chamber, a conduit opening into the upper portion of said chamber, a second conduit opening into the lower portion of said chamber, a plurality of trays extending horizontally across the interior of the chamber and so positioned as to divide the interior of the chamber into a plurality of zones lying between the respective openings of the two conduits into the chamber, said trays having uniformly disposed circular openings extending therethrough, a chimney having a substantially cylindrical body portion and flared outwardly at its lower end extending vertically and centrally through each opening from a point substantially above the tray to a point substantially below the tray, the diameters of the respective openings through the trays being greater than that of the body portion of the chimney but less than the maximum diameter of the flared, lower end of the chimney.

5. Apparatus for effecting uniform intimate contact between a gaseous medium and a finely divided fluidized solid, comprising a vertically elongated chamber, a conduit opening into the upper portion of said chamber, a second conduit opening into the lower portion of said chamber, a plurality of trays extending horizontally across the interior of the chamber and so positioned as to divide the interior of the chamber into a plurality of zones lying between the respective openings of the two conduits into the chamber, said trays having uniformly disposed circular openings extending therethrough, a chimney having a substantially cylindrical body portion and flared outwardly at its lower end extending vertically through each opening from a point substantially above the tray to a point substantially below the tray, the diameters of the respective openings through the trays being greater than that of the body portion of the chimney but less than the maximum diameter of the flared lower end of the chimney, the ratio of the total chimney area to the total tray area being within the range of 1:3.5 to 1:15.

MARION J. WILCOX.
RALPH E. HALL.

REFERENCES CITED

The following references are of record in the file of this patent:

FOREIGN PATENTS

| Number | Country | Date |
|--------|---------|------|
| 21,029 | Great Britain | Dec. 15, 1944 |